Oct. 23, 1945.  H. F. OLIVER  2,387,705
FLEXIBLE COUPLING
Filed March 31, 1944

INVENTOR.
Herbert F. Oliver.
BY Walter C. Ross,
Attorney.

Patented Oct. 23, 1945

2,387,705

UNITED STATES PATENT OFFICE 2,387,705

FLEXIBLE COUPLING

Herbert F. Oliver, West Springfield, Mass., assignor to The F. W. Sickles Company, Chicopee, Mass., a corporation of Massachusetts Application March 31, 1944, Serial No. 528,924

4 Claims. (Cl. 64—12)

This invention relates to improvements in coupling devices and is directed more particularly to improvements in devices for connecting shafts and the like.

The principal objects of the invention are directed to the provision of a coupling device adapted and arranged to operatively connect shafts the axis of which are misaligned or shafts where the axes are in non-parallel planes or at an angle relative to one another or both.

The coupling of the invention is adapted for broad application but finds one important use in connection with radio apparatus where the components are of small size and closely related and it is difficult to arrange the units to be interconnected with their shafts in parallelism and in axial alignment.

Various novel features and advantages of the invention will be hereinafter more fully referred to in connection with the accompanying drawing of the present preferred form thereof.

Figure 1:
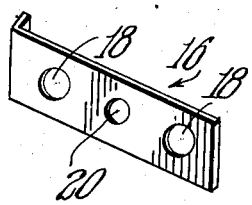
Fig. 1 is a perspective view of one of the plates of the coupling.

Referring now to the drawing more in detail, the invention will be fully described.

Figure 2:
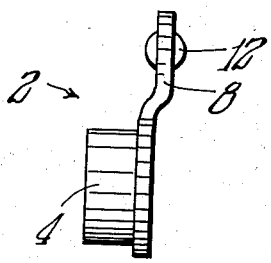
Fig. 2 is an edge view of the member shown in Fig. 3.
Figure 3:
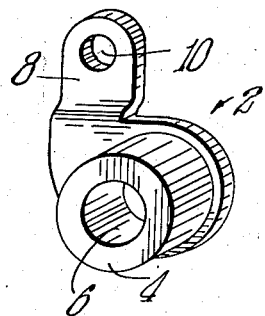
Fig. 3 is a perspective view of one of the shaft members of the coupling of the invention.

A shaft member is represented by 2 in Figs. 2 and 3 which has a hub 4 provided with a bore 6 for receiving a shaft to which it may be secured by any suitable means.

An upper arm portion 8 of the member 2 is offset rearwardly from the lower portion and is provided with an opening 10. A ball 12 is disposed in the opening 10 and is secured therein by a swedging, peening, or other operation and in such a manner that opposite sides of the ball project outwardly from the part 8 at opposite sides.

There are two such members 2 used in the construction of the coupling and these may be identical so as to eliminate right and left hand components.

A plate is represented by 16 which is preferably made from metal that is more or less spring-like so as to be yieldable or resilient. The plate has end openings 18 for receiving the balls 12 and a central opening 20 for receiving securing means such as a rivet, bolt or the like.

There are two such plates 16 used in the coupling assembly and are preferably identical.

In assembling the components the members 2 are arranged back to back with their hubs extending outwardly. The plates 16 are arranged so that the openings 18 thereof receive the balls 12 and they are secured together by means of a rivet 22 or the like extending through the central openings 20 thereof. The means for securing the plates 16 together will be so arranged that the plates are under more or less tension. The openings 18 are slightly less in diameter than the diameter of the balls 12. The plates may be secured together in such a way that they are more or less bowed inwardly towards one another intermediate their ends and being yieldable or resilient opposite ends of the plates yieldingly engage the balls.

By means of the plates and balls the members 2 are connected for relative swiveling movements so that the said members 2 may move relative to one another in different directions.

Figure 4:
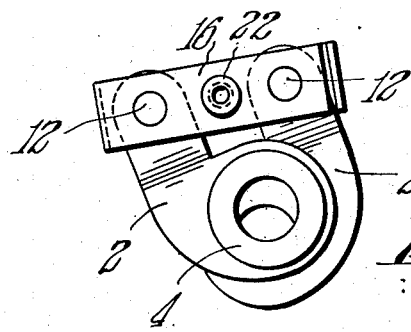
Fig. 4 is a front elevational view of the parts of the coupling in assembled relation.
Figure 5:
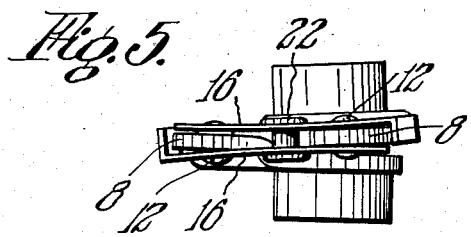
Fig. 5 is a plan view of the coupling shown in Fig. 4.

In Fig. 4 the members 2 are shown as they might appear when connected to shafts which are considerably out of axial alignment and in addition to being out of alignment the shafts may be disposed so that planes passing through their axes are angularly disposed. In such a case the coupling components may assume the relation shown in Fig. 5.

The construction is such that the members 2 may move freely relative to one another as the shafts to which they are secured rotate. The members 16 are of such a nature and they so engage the balls 12 that the members 2 are flexibly connected thereby to flexibly connect shafts disposed in the hubs.

Figure 6:
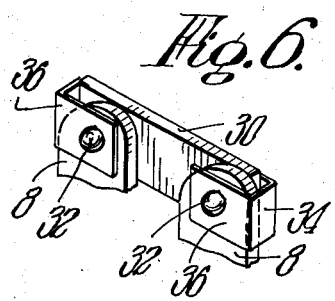
Fig. 6 is a partial perspective view of a modified form of the invention.

According to the form of the invention shown in Fig. 6, a plate 30 is provided which has openings in opposite ends thereof for receiving balls 32. Clips 34 made from relatively thin yieldable and resilient metal in the form of a U has holes for receiving the balls 32 in the side portions 36 thereof.

The balls 32 have their outer sides extending beyond the arms 8 and plate 30 and are receivable in the holes in the side portions 36, these holes being slightly less in diameter than the balls.

The plate 30 may be made from insulating material such as Bakelite or the like and will insulate the ends 8 of the members 2 when that is necessary.

The clips yieldingly engage the balls and being yieldable or springlike allow movements of the plate 30 and ends 8 of members 2.

What it is desired to claim and secure by Letters Patent of the United States is:

1. A flexible coupling construction comprising in combination, a pair of similar members having bores for securing to shafts and provided with outwardly extending arm portions provided with balls having portions extending from opposite sides thereof, a pair of flexible plates secured together intermediate their ends having openings in opposite ends receiving said balls.

2. A flexible coupling construction comprising in combination, a pair of similar members in back to back relation having hubs for shafts projecting from outer sides thereof, radially extending portions provided with balls having opposite portions extending from opposite faces thereof, a pair of similar resilient plates secured together intermediate their ends disposed on opposite sides of the radially extending portions and provided with openings in their ends receiving said balls.

3. A flexible coupling construction comprising in combination, a pair of similar shaft members disposed in back to back relation having hubs extending from their outer sides and upwardly extending portions provided with balls having opposite sides projecting at opposite sides of said portions, the said upwardly extending portions disposed in spaced apart relation, plates at opposite sides of the upwardly extending portions secured together intermediate their ends having openings in opposite end portions receiving the projecting opposite sides of the balls.

4. A flexible coupling construction comprising in combination, a pair of similar shaft members disposed in back to back relation having hubs extending from their outer sides and upwardly extending portions provided with balls having opposite sides projecting at opposite sides of said portions, the said upwardly extending portions disposed in spaced apart relation, plates at opposite sides of the upwardly extending portions secured together intermediate their ends having openings in opposite end portions receiving the projecting opposite sides of the balls, said plates being relatively resilient and the means securing them together arranged whereby the ends thereof yieldingly bear on said balls.

HERBERT F. OLIVER.